June 21, 1938. J. G. COLLINS 2,121,069
CIRCULAR SAW
Filed June 14, 1937 3 Sheets-Sheet 3

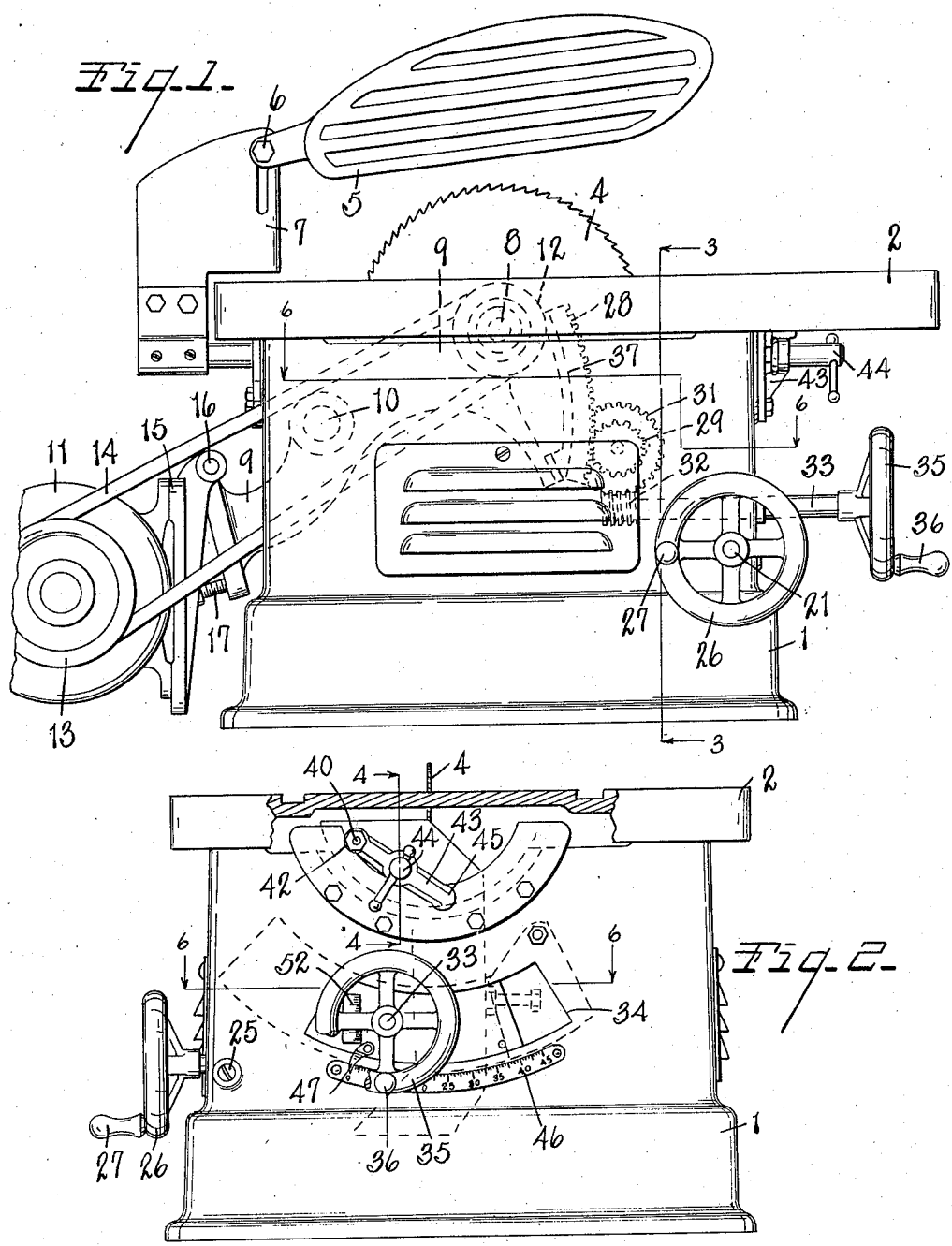

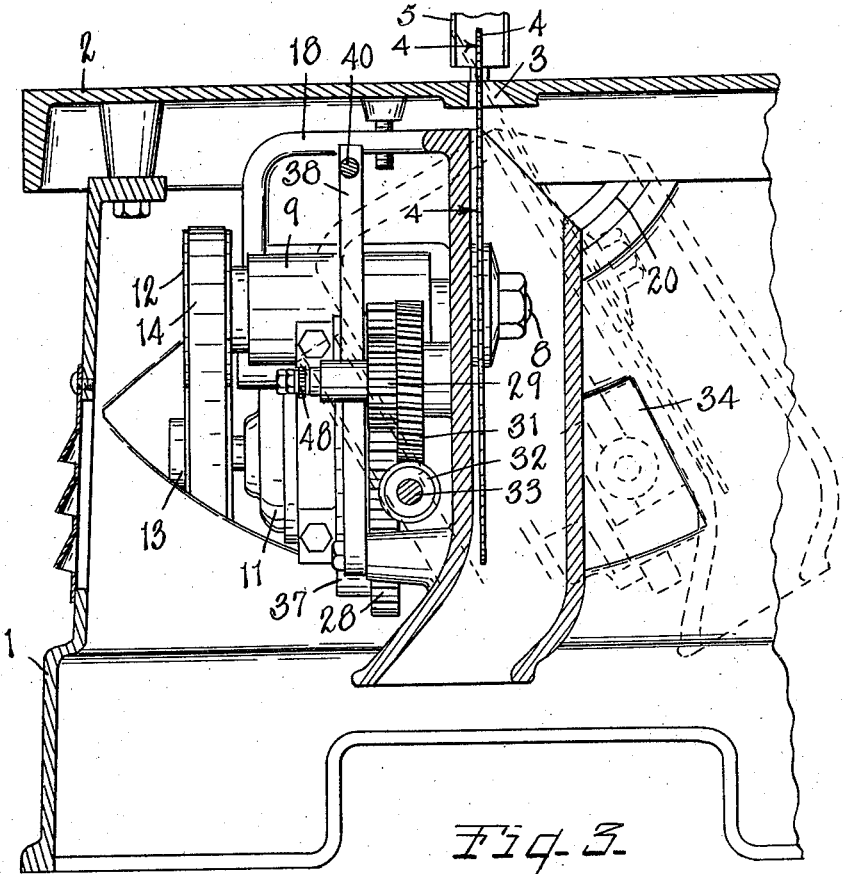
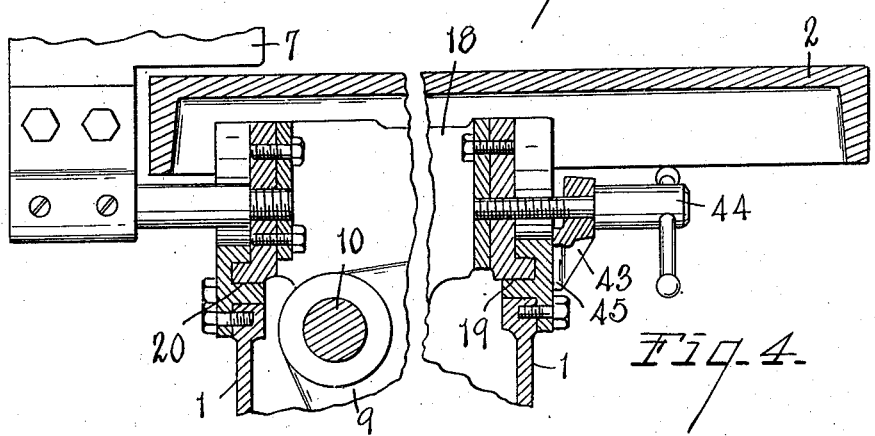

INVENTOR.
James G. Collins
BY Earl & Chappell
ATTORNEYS.

Patented June 21, 1938

2,121,069

UNITED STATES PATENT OFFICE 2,121,069

CIRCULAR SAW

James G. Collins, Kalamazoo, Mich., assignor to Atlas Press Company, Kalamazoo, Mich.

Application June 14, 1937, Serial No. 148,062

5 Claims. (Cl. 143—36)

This invention relates to circular saws and in particular to that type of circular saw in which the saw extends through a slot in the table and may be raised or lowered and tilted with reference to the table for sawing to different depths or at different angles.

The invention has for its objects:

First, to produce a new and improved saw of the above type.

Second, to produce such a saw with improved tilting and elevating mechanisms thereon.

Third, to provide such a saw with improved locking means for holding the saw in adjusted position.

Further objects and advantages pertaining to details and economies of construction and operation will appear from the description to follow.

A structure embodying the features of my invention is illustrated in the accompanying drawings, wherein:

Fig. 1 is a side elevational view of a saw embodying my invention.

Fig. 2 is an elevational view taken from the right hand end of Fig. 1.

Fig. 3 is a detailed sectional view taken on the line 3—3 of Figs. 1, 5, and 6, showing the saw in one position in full lines and in dotted lines in another position.

Fig. 4 is a broken sectional view on the lines 4—4 of Figs. 2 and 3, showing the details of the cradle mounting for the saw support.

Figures 5, 6:
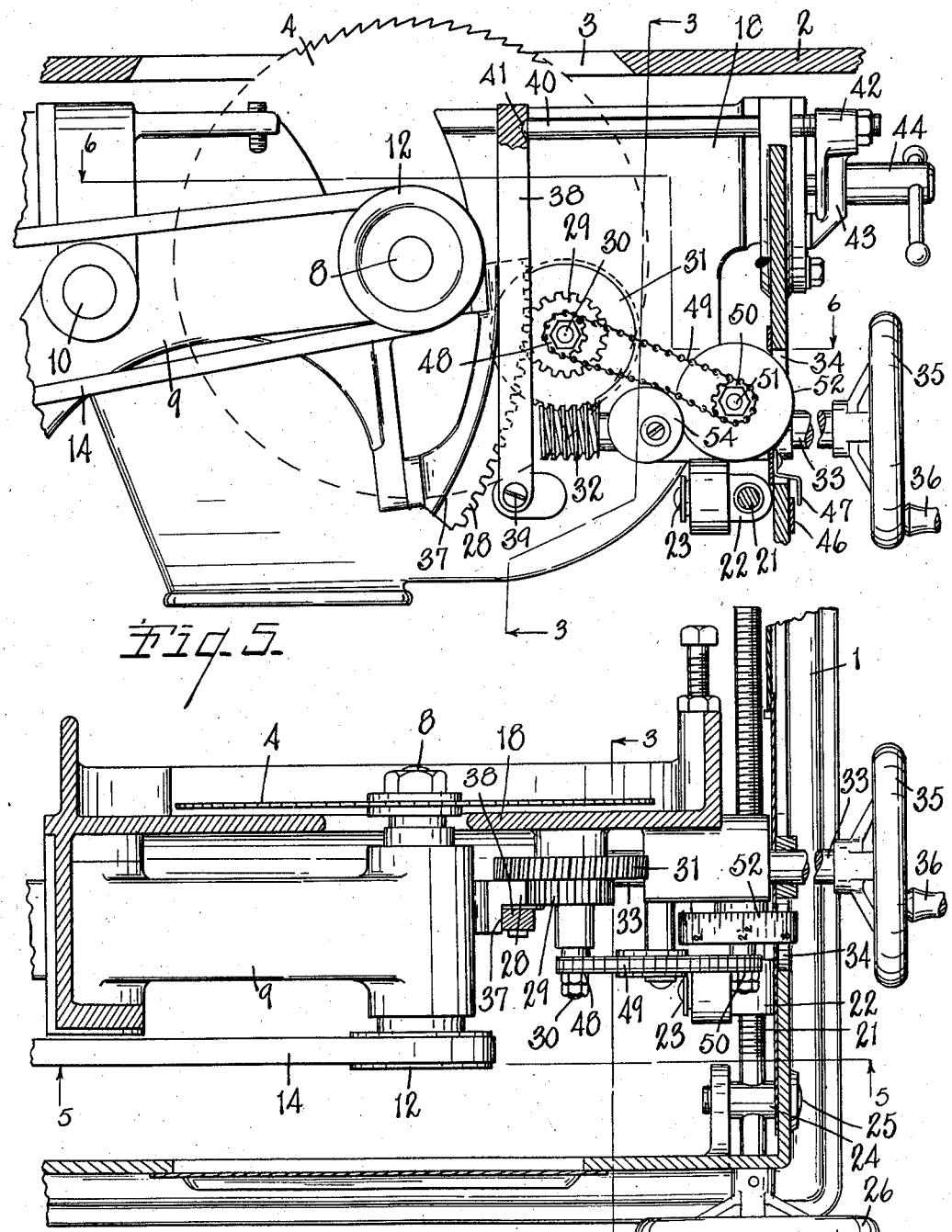
Fig. 5 is a detailed sectional view taken on the line 5—5 of Fig. 6, showing the means of mounting the saw arbor and the means for clamping it in adjusted position.
Fig. 6 is a detailed sectional view taken on the line 6—6 of Figs. 1, 2, and 5, showing the tilting mechanism for adjusting the saw supporting cradle.

1 is the frame of the saw supporting a saw table 2 which has a slot 3 therein through which the circular saw 4 may be adjusted vertically. 5 is a saw guard pivotally supported at 6 on a splitter 7 which is in line with the saw blade above the table 2.

The saw is mounted on an arbor 8 on the end of a pivoted arm 9 which is pivoted to the pivot 10 and has at its other end a motor 11. A pulley 12 is provided for the saw arbor and a pulley 13 is provided for the motor. These are preferably connected by a V-belt 14, and since the arbor and motor are maintained in fixed relationship at all times, the vertical adjustment of the saw in and out of the slot 3 does not necessitate continual adjustment of the belt 14.

The motor is mounted on a platform 15 which is hinged at 16 to the arm 9 and is provided with a set screw 17 for adjusting the distance between the motor and the pulley. The arrangement with the saw arbor at one end of the arm 9 and the motor 11 at the other end thereof assists in adjustment because the motor and the saw counterbalance one another.

The pivot 10, on which the arm 9 is pivoted, is mounted on a cradle 18 which is mounted on trunnions 19 and 20 on the frame 1. The trunnions are so disposed that the cradle 18 may be rotated about an axis which coincides with the line of intersection between the saw and the table top so that the saw, regardless of its tilted position, is always disposed at the same place on the table top. In order to rotate the cradle 18 on its trunnions 19 and 20 and to adjust the position thereof, I provide a screw 21 which is screw threaded in a nut 22 which is pivoted at 23 on the cradle 18. The other end of the screw is provided with a thrust bearing 24 which holds the screw in fixed position for rotation. The thrust bearing is pivoted to the frame at 25 and a wheel 26 with a crank handle 27 thereon is mounted on the screw for rotating the same. It will be apparent that by turning the screw it is possible to move the cradle from the full lined position in Fig. 3 to various positions such as the one indicated by dotted lines in that figure. The splitter 7 is mounted on the cradle so that it is in line with the same at all times.

In order to raise and lower the saw, I provide a curved rack 28 at the end of the arm 9 adjacent the saw arbor. A pinion 29 is fixed on shaft 30 rotatably mounted on the cradle 18 in mesh with said rack, and on the same shaft 30 to which the pinion is fixed, I fix a worm gear 31 which is in mesh with a worm 32 on a shaft 33 mounted on the cradle and extending through a segmental opening 34 in the front of the frame 1. A wheel 35 with a crank handle 36 is provided for turning the shaft 33.

To lock or clamp the saw in adjusted position, I provide on the end of the arm 9 a curved brake shoe 37. A brake beam 38 has one end pivoted at 39 to the cradle 18 and is disposed to engage the curved surface of the brake shoe 37. A brake rod 40 is mounted on the cradle 18 and has one end fitting in a socket 41 on the end of the brake beam 38 to push the brake beam into engagement with the curved brake shoe 37. The other end of the brake rod 40 engages the end 42 of a cross member 43 which is mounted on the cradle 18 and is provided with a clamping member 44 for clamping the cross member 43 against the cradle 18. The other end 45 of the cross member 43 is disposed to clamp against the frame 1 when the clamping member 44 is tightened, so that a tightening of the clamping member serves to hold the saw firmly in its elevated position through the pressure on the brake beam 38 and to hold the saw and cradle against tilting movement by clamping the cradle firmly against the frame 1.

In order to permit the operator of the saw to read the angle of the saw with reference to the table top, I provide a gauge or scale 46 on the frame and a cooperating pointer 47 on the cradle and extending through the opening 34 in the frame.

To determine the elevation of the saw above the table top, I provide a simple gauging mechanism consisting of a sprocket 48 mounted on the shaft 30 which carries the pinion 29 and the worm gear 31, having a chain 49 extending thereover and in engagement with a sprocket 50 mounted on a shaft 51 on which is mounted a scale 52, said shaft and scale being carried upon the cradle 18 to permit a reading of the height of the saw. An idler eccentric 54 is provided for keeping the chain 49 at the desired tension.

I have shown a preferred embodiment of my invention and wish to claim the same specifically and also broadly as pointed out in the appended claims.

Having thus described my invention, what I claim as new and desire to secure by Letters Patent is:

1. In a saw, the combination of a frame, a saw table supported thereon having a slot through which the saw projects for use, a saw, a saw carrying cradle on trunnions in said frame to rotate about an axis which lies at the intersection of the saw and the table top, means for adjusting the position of the cradle on its trunnions, an arm pivotally mounted on said cradle between its ends carrying a saw arbor at one end on which said saw is mounted for movement through the slot in the table top, a motor at the other end of said pivoted arm, a belt drive between said motor and said saw arbor, means for adjusting the elevation of said saw arbor by turning said arm on its pivot, an opening in said frame adjacent one trunnion of said cradle, means for holding said cradle and saw in adjusted position, comprising a curved brake shoe on said pivoted arm, a brake beam pivoted on said cradle and in operative relation to said shoe, clamping means on said cradle extending through a slot in said frame, a cross piece on said clamping means having one end engageable with said frame and the other end engageable with a brake rod, and a brake rod connecting the other end of said cross piece with said brake beam whereby tightening of the clamping means forces one end of said cross piece against the frame and the other end of said cross piece against said brake rod to clamp said brake beam against said brake shoe whereby the saw is held firmly in adjusted position.

2. In a saw, the combination of a frame, a saw table supported thereon having a slot through which the saw projects for use, a saw, a saw carrying cradle on trunnions in said frame to rotate about an axis which lies at the intersection of the saw and the table top, means for adjusting the position of the cradle on its trunnions, an arm pivotally mounted on said cradle between its ends carrying a saw arbor at one end on which said saw is mounted for movement through the slot in the table top, means for adjusting the elevation of said saw arbor by turning said arm on its pivot, an opening in said frame adjacent one trunnion of said cradle, means for holding said cradle and saw in adjusted position, comprising a curved brake shoe on said pivoted arm, a brake beam pivoted on said cradle and in operative relation to said shoe, clamping means on said cradle extending through a slot in said frame, a cross piece on said clamping means having one end engageable with said frame and the other end engageable with a brake rod, and a brake rod connecting the other end of said cross piece with said brake beam whereby tightening of the clamping means forces one end of said cross piece against the frame and the other end of said cross piece against said brake rod to clamp said brake beam against said brake shoe whereby the saw is held firmly in adjusted position.

3. In a saw, a saw table having a slot through which the same projects for use, a pivoted arm having a saw arbor at one end on which a saw is mounted and having a motor mounted at the other end, a belt drive between the motor and the saw arbor, means for adjusting the elevation of the saw arbor by turning said arm on its pivot, comprising a curved rack at one end of the pivoted arm adjacent the saw arbor, a pinion in mesh with said rack, a worm gear operatively connected to rotate said pinion, a shaft having a worm thereon in mesh with said worm gear, and means for rotating said shaft, a curved brake shoe on said pivoted arm, a brake beam pivoted in operative relation to said shoe, and means for clamping said brake beam against said shoe to hold said saw firmly in adjusted position.

4. In a saw, a saw table having a slot through which the same projects for use, a pivoted arm having a saw arbor at one end on which a saw is mounted, means for adjusting the elevation of the saw arbor by turning said arm on its pivot, comprising a curved rack at one end of the pivoted arm adjacent the saw arbor, a pinion in mesh with said rack, a worm gear operatively connected to rotate said pinion, a shaft having a worm thereon in mesh with said worm gear, and means for rotating said shaft, a curved brake shoe on said pivoted arm, a brake beam pivoted in operative relation to said shoe, and means for clamping said brake beam against said shoe to hold said saw firmly in adjusted position.

5. In a saw, a saw table having a slot through which the same projects for use, a pivoted arm having a saw arbor at one end on which a saw is mounted, means for adjusting the elevation of the saw arbor by turning said arm on its pivot, a curved brake shoe on said pivoted arm, a brake beam pivoted in operative relation to said shoe, and means for clamping said brake beam against said shoe to hold said saw firmly in adjusted position.

JAMES G. COLLINS.